July 15, 1941.  W. KASTEN  2,249,427
VALVE MECHANISM FOR ENGINES
Filed Oct. 26, 1938   5 Sheets-Sheet 2

INVENTOR
Walter Kasten,
BY
Harris S. Campbell
ATTORNEY.

Patented July 15, 1941

2,249,427

UNITED STATES PATENT OFFICE 2,249,427

VALVE MECHANISM FOR ENGINES

Walter Kasten, Franklin, Mich., assignor to Skinner Aircraft Engines Incorporated, Washington, N. J., a corporation of Delaware Application October 26, 1938, Serial No. 236,983

18 Claims. (Cl. 123—75)

This invention relates to engines and is particularly concerned with the valve mechanism thereof.

In internal combustion engines one form of valve used in controlling the flow of gases into and out of the combustion chamber is the sliding type valve. Valves of the sliding type have a reciprocal movement which is positively controlled at all times, no return springs being required. It is primarily with an engine construction using valves of this general type that the present invention is concerned.

The operating mechanism of the present invention is equally applicable to any valve construction in which sliding movement is used, for example, sleeve valves, piston valves, flat slide valves or curved slide valves. The example shown in this application is adapted for use with the curved sliding valve. Each valve takes the form of a half cylinder having a thin wall. Such valves are placed between the cylinder barrel in which the piston operates and the outside cylinder wall.

Engines of the radial type have a number of cylinders located in a plane perpendicular to the axis of the crankshaft. The cylinders extend radially outwardly at different angles from the center line of the crank shaft. The problem of providing satisfactory operating mechanism for valves of the slide type has been such that heretofore a simple and satisfactory mechanism has not been developed, such prior mechanism usually involving a complicated system of double acting cams for operation of the slide valves or an individual gear driven crank or eccentric for each valve.

A primary object of the present invention is to simplify the valve operating mechanism for a radial engine using slide valves. A specific object is the provision of a number of valve shafts equal to the number of cylinders in a radial engine, each valve shaft being adapted to actuate two valves.

Another important object is to reduce the weight and number of parts of valve operating mechanism for engines incorporating slide valves.

A more specific object of the invention is to coordinate the relationship of the valve rods, valve operating cranks and their arrangement with respect to the cylinders and crankshaft of an engine to permit at least two valves to be operated from a single valve crank.

Another object of the invention is to provide slide valve mechanism for a radial engine which may be disposed at either side of the cylinders to suit a particular disposition of other parts of the engine. At the present time engines of the radial type are used extensively as power plants for aircraft, since engines having this cylinder arrangement can be built for low weight per horsepower and also are readily adapted to air cooling. In aircraft engines, therefore, it may sometimes be desirable to place the valve operating mechanism at the side of the engine remote from the propeller, while at other times it may be desirable to locate the valve mechanism on the propeller side of the engine, depending upon the particular accessories and supplemental drives to be provided with the engine. Particularly when a supercharger fan is to be built into the engine, it may be desirable to place the valve mechanism on the propeller side. The mechanism of the present invention can readily be accommodated to either the propeller side or the opposite side of the crankcase.

Another object of the invention is to provide a slide valve operating mechanism having an arrangement of parts which will permit easy assembly and disassembly from the engine casing.

A further object of the invention is to provide a support for the valve rods in the crank case of the engine in a fashion to permit removal of the engine cylinders from the crankcase without disturbing the assembly of the operating mechanism for the valves.

In radial engines having sliding type valves of the type requiring at least two valves per cylinder many varying types of conditions may be met as regards the relative timing of these valves. The specific timing required will, of course, be dependent on such conditions as the cycle on which the engine operates, its normal speed of operation, type of ignition used, and the like. It is an object to provide a type of valve mechanism which may be designed to satisfy any of the varied timing requirements while still maintaining a simple valve mechanism.

Another object of the invention is to provide a valve operating crank in the angle between two adjacent cylinders of a radial engine and arrange the intake valve of one cylinder to be adjacent to the exhaust valve of the adjacent cylinder, both valves being connected to the single crank which actuates both valves.

Another object of the invention is to provide an operating mechanism for the intake valve of one cylinder and the exhaust valve of an adjacent cylinder in which the intake port is open at the top of the intake valve stroke and the exhaust port is open at the bottom of the exhaust valve movement. The part of the cylinder remote from the crankshaft is referred to as the top.

A still further object of the invention is to arrange parts of the valve drive mechanism including the gears and valve-shafts, to permit the drive of engine accessories and the like through these parts.

It is also an object of this invention to provide a slide valve system for a radial engine which operates in a separate chamber from the crank and connecting rods. This feature permits control of the lubrication to the valve system, thus eliminating the undesirable oil-pumping action with consequent excessive oil consumption which sometimes results when the valve mechanism is located in open contact with the crank chamber.

How these and other objects and advantages are accomplished will be evident from the description of the drawings in which—

Figure 1:
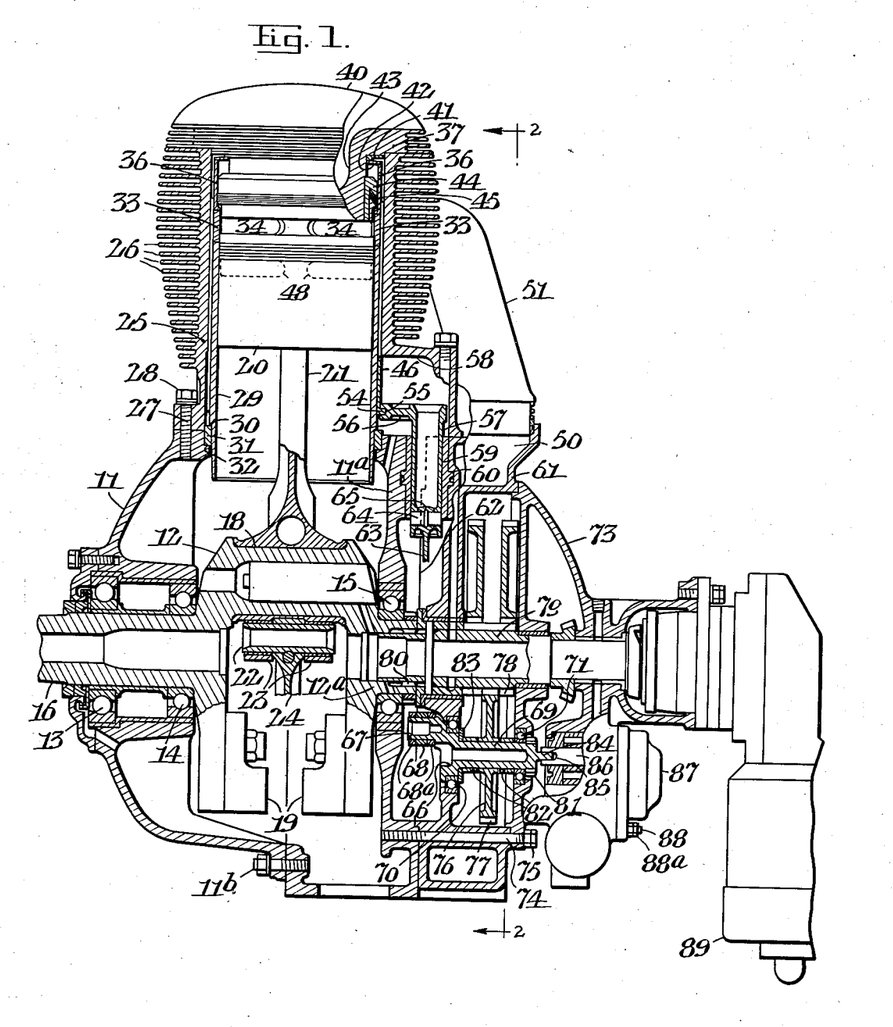
Figure 1 is a sectional view generally on the line 1—1 of Figure 2 of an engine incorporating the valve mechanism of the present invention.
Figure 2:
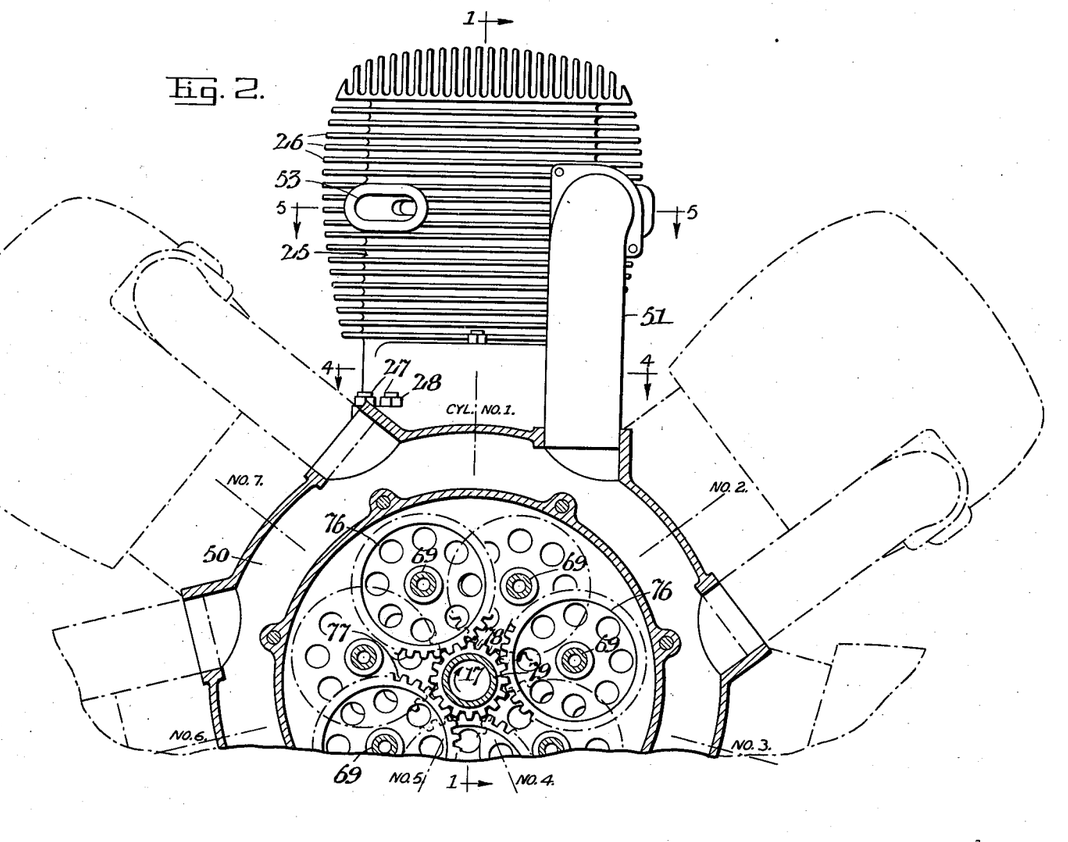
Figure 2 is a view generally in the direction of arrows 2—2 of Figure 1, certain parts being shown in section.

An engine incorporating the valve mechanism of the present invention is shown in Figures 1 and 2. This engine is of the radial type and has a crankcase having front casing 11 and rear casing 11a fastened together by studs 11b. The crankshaft 12 is supported in the crankcase by antifriction bearings 13, 14 and 15. One end of the crankshaft 12 projects beyond the crankcase to form the propeller shaft 16. From Figure 2 it will be seen that the engine illustrated has 7 cylinders, the upper vertical cylinder being designated as a cylinder No. 1. Viewing the engine from the side remote from the propeller shaft, the other cylinders are numbered consecutively in a clockwise direction, this direction being the direction of crankshaft rotation as shown by the arrow 17. The crankshaft 12 has a bearing surface 18 on the crank portion and counter-weights 19 at a point opposite the crank.

In each of the cylinders is mounted a piston 20, the piston of No. 1 cylinder being connected to the crankshaft by a master connecting rod 21. The connecting rods from the other pistons are articulated to master rod 21 by means of pins 22 which are supported in bearings 23 in the master rod assembly. A portion of the connecting rod of cylinder No. 5 is shown at 24. This crankshaft, connecting rod, and piston assembly is in accordance with regular radial engine design and need not be described in greater detail.

Figure 4:
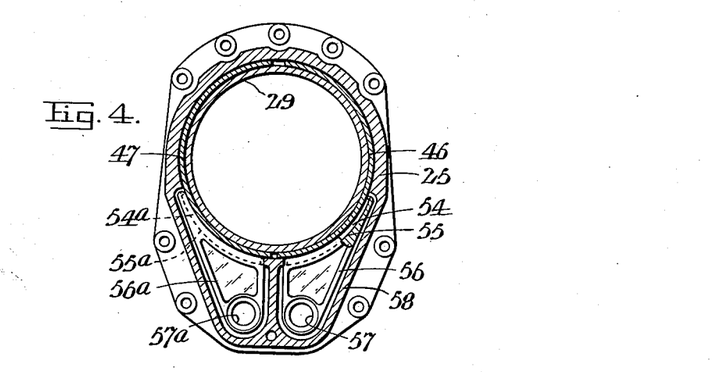
Figure 4 is a sectional view on the line 4—4 of Figure 2, showing the valve parts and their connection to their actuating mechanism.

The construction of the cylinders of the engine shown provides for valves of the sliding type. The cylinders have an outside barrel 25 having cooling fins 26 formed thereon. The outside barrel 25 is fastened to the crankcase 11 and 11a by means of studs 27 and nuts 28. The arrangement and spacing of these studs is shown in Figure 4.

Figure 5:
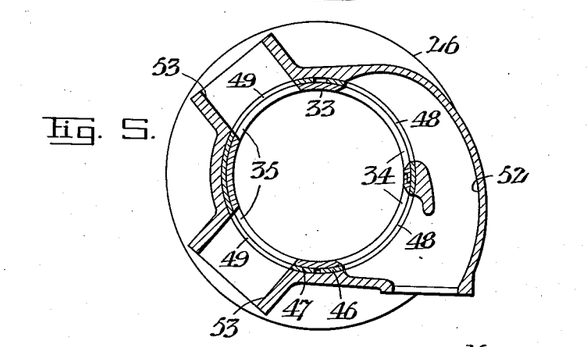
Figure 5 is a section view taken on the line 5—5, Figure 2 showing the arrangement of the valve ports.

The outside barrel may be made of a light metal such as aluminum alloy. An inner cylinder barrel 29 which may be made of steel or cast iron is mounted in the crankcase to form the cylinder in which the piston operates. Cylinder 29 is provided with a shoulder 30 which rests on annular ring 31. Ring 31 is supported by the flange 32 and projects slightly above the crankcase to locate outer cylinder 25. This arrangement allows the inner cylinder and valve members to be removed through the removable cylinder head without disturbing other parts. Above cylinder 29 is the sealing ring 33 which incorporates the openings or ports as indicated at 34 for the flow of gases into and out of the cylinder. In Figure 1 only the inlet ports 34 are indicated, but in Figure 5 the relative position of the exhaust ports 35 in the sealing ring 33 is shown.

In order to hold the sealing ring 33 and cylinder barrel 29 in place, a spacer cylinder 36 is arranged above the sealing ring 33. The cylinder head 37 is arranged to be held on the outer cylinder barrel 25 by means of studs 38 and nuts 39. The head portion 37 may also be composed of aluminum alloy or some light metal and is provided with fins 40 for cooling purposes.

Between the head 37 and the spacer cylinder 36 is placed a spacer or bearing washer 41 and a resilient or spring washer 42. This method of retaining the inner cylinder barrel permits a slight amount of relative movement between the inner cylinder barrel 29 and the head 37 to permit for variations in their expansion and contraction due to difference in temperatures, thus eliminating the possibility of a cylinder cracking which might otherwise occur due to the difference between the rates of expansion of the two different materials.

The head 37 has a cylindrical portion 43 which projects downwardly into the cylinder to a point below the top of the sealing ring 33. Around this cylindrical portion 43 is a cylindrical sealing member 44 having a series of dished or conical-shaped washers 45, commonly termed reeds, which contact against the spacer cylinder 36 and thereby adequately seal the compression chamber while allowing for the expansion and contraction referred to above, as well as for imperfections in alignment and the like.

In the annular cylindrical space between the outside cylinder barrel 25 and the inside cylinder barrel 29, the sliding valve members 46 and 47 are located. These sliding members are provided with ports 48 and 49 which are arranged to register with ports 34 and 35 in the sealing ring at the proper time to provide for inlet and exhaust of gases.

The gas mixture for combustion in the engine is delivered from the carburetor in the usual manner through the manifold 50 from which it is carried by means of pipes 51 to the intake chamber 52 and delivered through inlet ports 34 to the cylinder at the proper time during the cycle of operation. The outside cylinder barrel 25 is provided with exhaust outlets 53 to which suitable exhaust pipes may be attached to carry the exhaust gases away to any desired point. The relative arrangement of the intake and exhaust channels will be clear from the sectional view, Figure 5.

In Figure 4 the shape and disposition of the slide valves 46 and 47 are clearly shown. At the lower end of each valve is a flange or lip portion 54 extending for a portion of the distance around the base of the valve. A groove 55 in the arm or support member 56 fits over the flange 54. The arm 56 is attached to the valve rod 57. Parts 54a, 55a and 56a are similar to corresponding parts 54, 56 and 57 except that they are opposite hand, being connected to the exhaust valve 47. It will be noted that the arm 56 and groove 55 extend around to support a considerable portion of the valve so that the sliding movement is transmitted to it without the danger of misalignment or binding which might occur if the connection between the valve and the arm 56 were shorter. The lower end of the outer cylinder 25 is formed into a suitable shape to provide the chamber 58 to house the valve connecting arms 56 and provide suitable space for their movement during operation of the valves.

Figure 3:
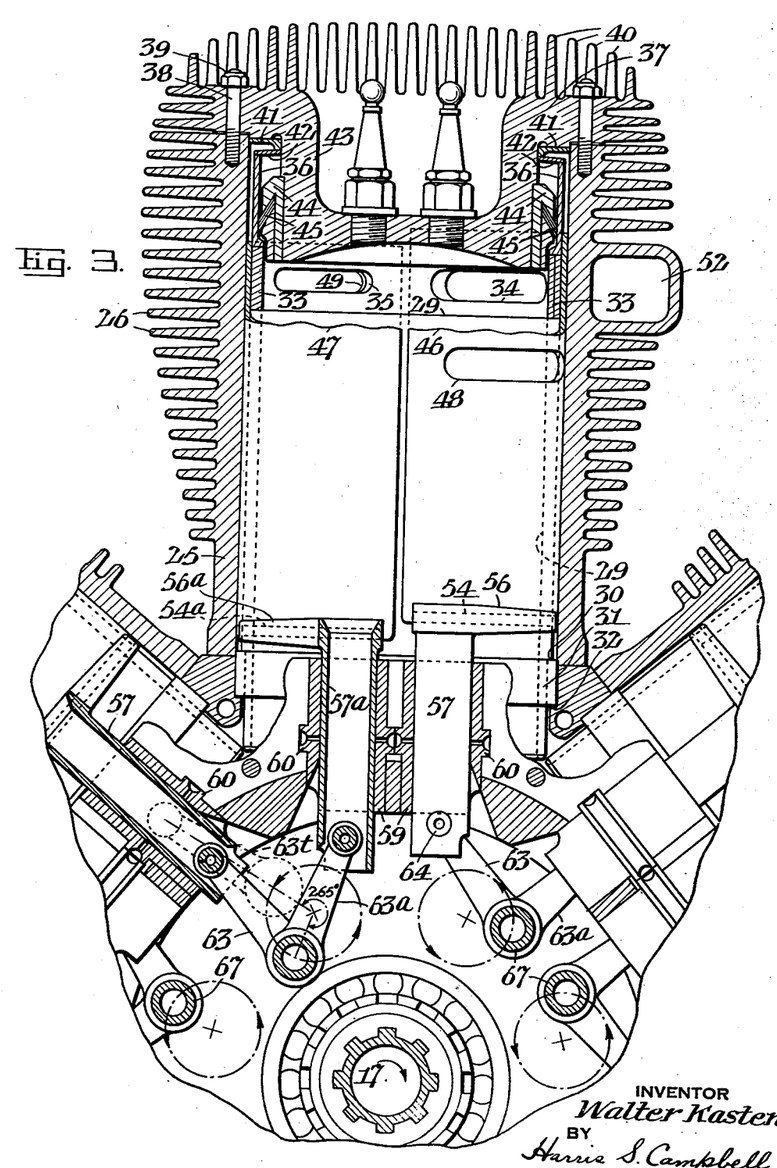
Figure 3 is an enlarged view of one of the cylinders shown in Figure 2, parts of the valve mechanism being shown in section.

Referring to Figures 1 and 3 it will be seen that each of the valve rods 57 is supported in a cylindrical guide 59 which has adequate length to assure proper support for each valve rod 57 during its sliding movement. Each of the guides 59 is retained in fixed position with relation to crank case 11a by means of a flange 60. A rear casing 61 is provided to form the housing for the valve gears and also to incorporate the intake manifold 50. The casing 61 is shaped to connect to the rear portion of the crank case 11a as shown by the line 62. The connection is close to the center line of the valve rods 57. When the casing 61 is bolted in place on the rear crank case part 11a, the valve guides 59 are thus locked in position.

At the lower end of each intake valve rod 57 is attached a short connecting rod 63 and a generally similar connecting rod 63a is attached to exhaust valve rod 57a. Each connecting rod is attached to a valve rod or guide 57 or 57a by means of a pin 64 which is retained in place by a small groove and spring device 65. By pin 64 provision is made for an oscillating movement between the connecting rod and the corresponding guide rod. The lower end of each of the connecting rods 63 and 63a is attached to a crank or eccentric member 66, the connecting rods being apertured or bored to receive the bearing of the eccentric portion 67. The end of the intake connecting rod 63 is provided with a single eye-type terminal 68 to fit the crank member 67. The connecting rods 63a are provided with a double or fork type terminal 68a which is assembled in straddled relation to the terminal 68 of the intake connecting rod. In this way the operating forces in the connecting rods are kept concentric. The valve crank or eccentric 66 has a stub shaft portion 69 which is mounted for rotation in bearings 70 and 71, bearing 70 being supported in a casing part 61 and bearing 71 being supported in the rear cover part 73. The same studs 74 and nuts 75 are used to retain both the casing 61 and the cover unit 73 in place on the rear crank case part 11a.

It will be seen that there is one crank member 66 for each cylinder of the engine, the engine in the present example having seven cylinders. The crank member 66 is located in the angle between two adjacent cylinders (when viewed in the direction of the crankshaft axis). It will also be noted that attached to each crank eccentric 67 is a connecting rod for the inlet valve of one cylinder and the connecting rod for the exhaust valve for the adjacent cylinder.

Each valve shaft 66 is driven from the engine crankshaft by means of a gear 76 which may be splined or keyed to the shaft 69. The teeth 77 on gear 76 mesh with corresponding teeth 78 formed on the extension shaft 79. The shaft 79 is mounted for rotation in suitable bearings in casings 73 and 61 and is driven from the rear end of the crankshaft member 12a, a suitable drive connection being provided between the crankshaft 12a and the shaft 79 by the spline 80. The gear parts including the teeth 78 on the shaft 79 and the gear 76 are suitably proportioned to provide for the rotation of the crank member 66 at one-half the speed of the crankshaft 12, thus providing for one complete cycle of the valve operating mechanism for each two revolutions of the crankshaft.

Since seven gears 76 are required it will be evident that these cannot be meshed with the teeth 78 all in the same plane. From Figures 1 and 2 it will be seen that to provide clearance between the different gears 76 each alternate gear is placed in alternate planes and the final or seventh gear placed in a third plane. While various combinations such as two gears in each of two planes and three gears in the third plane may be used, in all cases it is necessary to provide three different planes so that no two adjacent gears are in the same plane.

In Figure 1 at the rear end of shaft 69 a nut 81 is shown retaining the assembly of gear 76, spacers 82 and washer 83 in proper relationship. At the end of shaft 69 is a tongue member 84 which is shown extending into a groove 85 in shaft 86. Shaft 86 provides the drive for the engine oil pump 87 which is shown mounted on the rear cover casing 73 by studs 88 and nuts 88a. The shafts 69 of the other eccentric members 66 may also be provided with suitable terminals for the drive of accessories or the like, for example, tachometer, magneto, fuel pump, generator, hour-counter, timer, and gun-synchronizer.

It will be seen that the valve mechanism is substantially separated from the crank chamber. In this way the comparatively large quantity of oil which is present in the crank chamber during operation is prevented from being thrown into the valve mechanism. The lubrication of the valve mechanism can be controlled either by providing suitable small openings from crank chamber or by controlled pressure feed. Thus an excess of oil is prevented from reaching the valve mechanism with the result that engine oil consumption is lowered.

An electric engine starter 89 is shown connected to the rear cover casing 73 in a fashion to provide for rotation of the crankshaft 12 through the medium of shaft 79 during engine starting.

The valve mechanism and its relation to various parts of the engine having been described it will now be shown how this comparatively simple mechanism meets the requirements for proper timing of the valves for an engine of this type. The valve timing diagram shown in Figure 6 represents a typical valve timing for a four-cycle engine using slide valves of the type shown.

The diagram represents two complete revolutions of the crankshaft giving one complete cycle of operation for a cylinder. Starting from point A with the piston at the top of its stroke, the power stroke occurs during approximately the first 130° rotation before the exhaust valve opens at point B. The exhaust valve remains open during approximately 236° rotation from point B to point C which is about 6° past top dead center. The exhaust valve will therefore be wide open at point D which is located between B and C considering the direction of rotation indicated by the arrow. The intake valve opens at a point E about 6° before top dead center or 12° before exhaust valve closes completely. The intake valve remains open to point F and is wide open at point G located between E and F. Since the intake valve closes at point F, which is approximately 42½° past bottom dead center, compression occurs during the part of the rotation from F to H, which latter is top dead center. The cycle is then repeated starting at A.

In a seven cylinder, single row, radial engine, the cylinders are spaced 360/7=51.4° apart. Since the engine is operated on the four-cycle stroke, there are seven complete power strokes for each two revolutions or one power stroke for 720/7=102.8° of crankshaft rotation. The order of cylinder firing is 1, 3, 5, 7, 2, 4, 6. It will be seen, therefore, that the valve operation cycle in cylinder No. 7 will follow that of cylinder No. 1 by 102.8×3=308.4°, No. 7 being the third power stroke after No. 1. A slight variation due to difference of angularity between the link-rod cylinders and the master rod cylinder is neglected in the present description for simplicity.

Figures 6, 7:
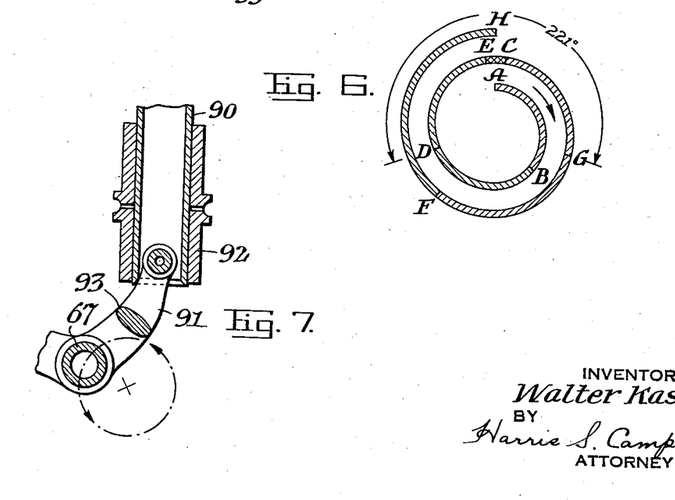
Figure 6 is a timing diagram for an engine of this type.
Figure 7 is a detail view of an alternative form of valve shaft connecting link.

From the timing diagram, Figure 6, it will be seen that the cycle of the exhaust valve for each cylinder precedes that of the intake valve by about 221° crankshaft angle. Therefore in the normal operation of the engine the time interval from wide open position of the exhaust valve of cylinder No. 1 to the wide open position of the intake valve of cylinder No. 7 is 308.4 plus 221°, or approximately 530° crankshaft angle. Since the valve shaft rotational speed is one-half that of the crankshaft (in the opposite direction of rotation) the angle through which the valve shaft moves during 530° crankshaft angle will be 530/2=265° valve crank angle.

In Figure 3, the exhaust valve 47 of cylinder No. 1 is shown with its port 49 in wide open position. This position is reached when the crank pin 67 reaches bottom dead center position, relative to the connecting rod 63a, as shown in Figure 3. It will be noted that for a dead center position of a connecting rod the center line of that connecting rod passes through the center of rotation of the crank member 66. The exhaust valve 47 therefore attains its wide open position at the bottom dead center position of the exhaust valve connecting rod 63a. A valve which reaches its full open position at its lowest point is known as a down pull valve.

Each inlet valve becomes wide open at the top of its travel. This is known as a push-up type of valve, and is the more usual mode of operation for slide valves. The inlet valve for cylinder No. 7 will, therefore, reach its wide open position after crank member 67 has moved in the direction of its rotation to a point where inlet valve connecting rod 63 is at its top dead center. This top dead center position is shown by dotted outline 63t. It will be noted that the angle of rotation of crank 67 from bottom dead center position of exhaust valve connecting rod No. 1 to top dead center position of inlet valve connecting rod No. 7 is 265°. This angle corresponds to the correct angular position shown as being desirable from the timing diagram. To obtain this 265° relationship, the center line of the crank member 66, the offset or throw of the crank 67 from its center of rotation, the length of connecting rods 63 and 63a and the position of the valve guides must all be properly proportioned and positioned. The relationship shown is for a seven cylinder engine to produce the valve timing of the diagram of Figure 6. This relationship can also be adjusted to obtain any other timing requirement within the normal limits of operational efficiency, either for a seven cylinder engine or a radial engine having more or less than seven cylinders.

For a push-up type of valve, the length of opening for the valve for a given port height will be less than for a pull-down type of valve due to the fact that the arc on the lower side of the circle formed between the tangential points of the connecting rod is longer than the arc between these tangential points on the upper side. To compensate for this longer opening of the exhaust valve, the exhaust port is made narrower than the intake port so that its time of opening is approximately equal to that of the inlet valve according to the opening time shown on the timing diagram. In the present example, the width of the exhaust valve ports is about seventy per cent that of the intake valve ports so that for valve ports of the same length, the exhaust ports will have about seventy per cent of the area of the intake ports. This is in accordance with good practice, although the lengths of the ports may be varied as desired to give any relative amount of area between the intake and exhaust ports. It will be seen, therefore, that the width of the port also enters into the relationship for obtaining the timing to produce the desired length of opening for either the exhaust or intake valves.

The above description outlines the relationship between the exhaust valve of cylinder No. 1 and the intake valve of cylinder No. 7, both of which are attached to a single valve shaft. The same relationship exists between the exhaust valve of cylinder No. 2 and the inlet valve of cylinder No. 1 as that described for cylinders No. 1 and No. 7. These two valves are therefore connected to the crank 67 positioned between cylinder No. 1 and cylinder No. 2. In similar fashion, the exhaust valve of cylinder No. 3 and inlet valve of cylinder No. 2, the exhaust valve of cylinder No. 4 and inlet valve of cylinder No. 3 and so forth around to the exhaust valve of cylinder No. 7 and inlet valve of cylinder No. 6 may be paired together and each pair connected to a valve crank 67 in the same manner as that described for cylinders No. 1 and No. 7. It will be obvious, of course, that the position of each valve shaft 66 must be adjusted to have the proper relative position to the pistons of the cylinders with which it is associated.

In Figure 7 is shown an alternative form which the conecting link between the valve shaft eccentric 67 and the valve guide or rod 90 may take. In this form, the connecting link 91 is curved somewhat in the plane in which it moves. In this plane the member 91 may be given sufficient depth to provide adequate strength against deflections under operating loads as by the sectional shape indicated at 93. This curvature improves the conditions for clearance during operation between the connecting link 91 and the valve 90 and the guide 92. The curved construction eliminates the need for cutouts in either the rod 90 or the guide 92 and thereby provides improved support for the valve rod 90.

In an alternative form of valve mechanism shown in Figures 8 to 12, both valves of a cylinder are connected to the same eccentric unit. As will be evident from Figure 9, the axis about which the eccentric unit rotates (the valve shaft axis) is in the plane formed by the axis of the crankshaft and the center line of the cylinder. This axis is indicated by numeral 94 in Figures 8, 9, 11 and 12.

Figure 8:
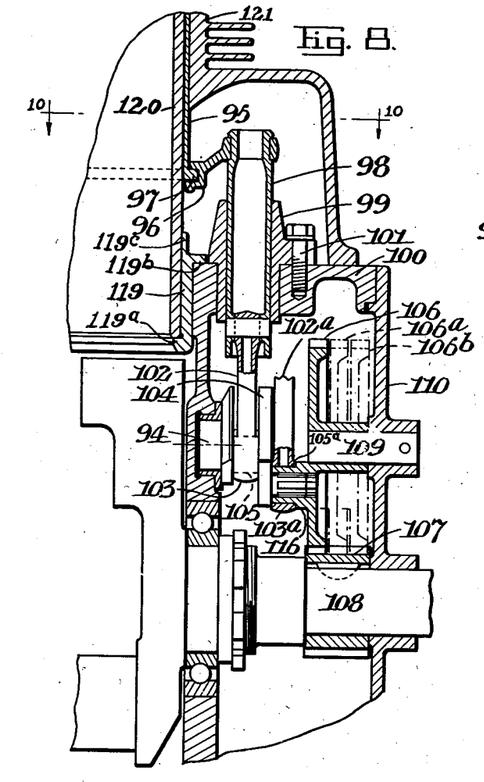
Figure 8 is a sectional view showing an alternative form of valve operating mechanism.
Figure 9:
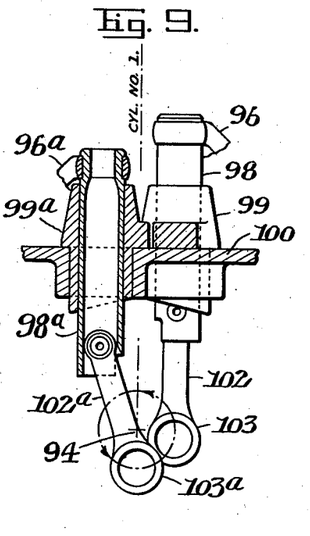
Figure 9 is a rear view of the intake and exhaust operating rods with certain parts in section showing their relative positions.
Figure 10:
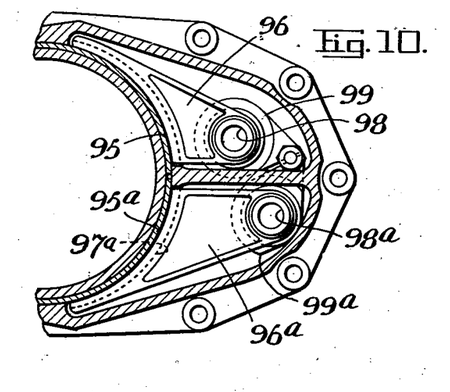
Figure 10 is a view taken on the line 10—10, Figure 8.

Referring to Figures 8, 9 and 10 it will be seen that the valves 95 and 95a are connected to the arms 96 and 96a by means of a small flange or lip 97 (97a) in a similar fashion to that described in connection with Figure 1. The arms 96 and 96a are attached to push rods 98, 98a which are supported for reciprocating motion in guides 99, 99a. These guides are anchored in the crankcase part 100 by studs or bolts 101.

From Figure 10 it will be seen that the arm 96 is shorter than arm 96a because the push rod 98 to which rod 96 is attached is closer to the cylinder than push rod 98a. Push rod 98 and arm 96 are connected to the exhaust valve 95 and the corresponding parts 96a and 98a are attached to the intake valve 95a.

The reason why push rods 98 and 98a are not in the same plane will be evident from the following description. The push rods 98 and 98a have connecting rods 102 and 102a pivotally connected to them, the lower ends 103 and 103a of both these connecting rods being attached to the same eccentric unit 104. There are two throws or cranks 105 and 105a on the eccentric unit 104 and the ends 103 and 103a of the connecting rods 102 and 102a are attached respectively to the cranks 105 and 105a.

The eccentric unit 104 may be driven by means of a gear 106 meshed with a pinion gear 107 mounted on the crankshaft 108. The other gears are placed in different planes as indicated by broken outline at 106a and 106b in order to provide for clearance between adjacent gears as described previously. Each gear 106 is mounted for rotation on a shaft 109 which is fixed in the cover plate 110.

Figure 11:
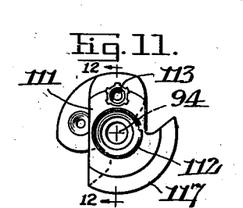
Figure 11 is a view of the eccentric unit shown in Figure 8.
Figure 12:
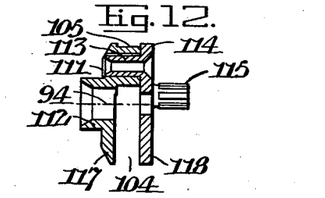
Figure 12 is a sectional view taken on the line 12—12, Figure 11.

The construction and assembly of the eccentric unit 104 is shown in greater detail in Figures 11 and 12. One part 111 of the eccentric unit 104 has a cylindrical projection 112 forming a bearing which rotates in the crankcase 100 as shown in Figure 8. The eccentric bearing or crank 105 is formed on part 111. A splined part 113 attached to another part 114 of the eccentric unit 104 fits inside crank part 105. A second splined part 115 also projects from part 114 to fit into a suitable receiving boss 116 attached to the gear 106. Boss 116 forms the crank 105a which actuates the intake valve mechanism. Counterweights 117 and 118 are formed on parts 111 and 114. This construction for the eccentric unit 104 eliminates the need for split bearings at the lower ends of the connecting rods 102 and 102a and also provides a simple assembly arrangement in which all parts are retained in proper relationship by the rear cover plate 110.

This alternative form of valve operating mechanism provides for operation of the valves to give any desired timing conditions, for example, to give the valve timing as shown by the timing diagram in Figure 6. With the double crank eccentric arrangement both the intake and the exhaust valves are operated as push-up type valves. In some cases it is desirable to be able to change the valve timing after an engine has been constructed. This can readily be done with the double crank eccentric by providing new eccentric units having a different angle between the cranks 105 and 105a. With a double crank eccentric unit 104 a valve timing as indicated in Figure 6 can be readily provided as follows. As previously described the exhaust valve cycle precedes the intake valve cycle by about 221° crankshaft angle for this timing. However each double crank eccentric unit is concerned with only one cylinder. Therefore the angle between the two cranks 105 and 105a will be such that it provides for full opening of the intake valve at 221/2 or about 110° valve shaft angle after the full open position of the exhaust valve.

It will be noted that the ring 119 which supports inner cylinder 120 is somewhat different in construction than that shown in Figure 1. The ring 119 has a lip 119a which supports the inner cylinder member 120 without the need of a shoulder on the latter. Flange 119b supports the ring on the crankcase 100 and upward projection 119c forms the guide for locating the outer cylinder barrel 121.

When an intake valve and an exhaust valve of a radial engine are connected to a single valve shaft in the manner described for the present invention, the maximum load applied to the valve shaft is only a small amount greater than when a single valve is operated from a valve shaft. The reason for this is that the maximum inertia forces for the two valves do not occur at the same time. At the time the inertia force for the intake valve is a maximum the inertia force for the exhaust valve has a comparatively low value and is operating in a different direction. Similarly the frictional forces of the two valves are operating in different directions. Therefore when all the forces are combined vectorially the maximum resultant force for two valves is not more than about twenty percent greater than the maximum resultant force for a single valve.

From the foregoing description it will be evident that I have provided a greatly improved and simplified system for the actuation of sliding type valves. While the examples herein considered are for internal combustion engines of the four cycle type it will be obvious to those skilled in the art that the principles of operation of the valve system may be adapted to engines operating on other cycles and also to other types of engines such as steam engines and air motors. The actuation of two valves from a single eccentric obviously decreases the number of parts required in the valve mechanism and reduces the weight and cost. By the use of my improved valve mechanism the many advantages associated with engines of the type having two sliding type valves for each cylinder may now be realized in radial engines. By the improved valve assembly and casing arrangement oil consumption and servicing problems are reduced to a minimum. Assembly or disassembly of the engine for inspection or repair becomes a greatly simplified procedure since the valve operating mechanism may be quickly removed without disturbing other parts of the engine. Also cylinder barrels and valves may be removed as desired without disturbing the valve operating mechanism or other parts of the engine.

I claim:

1. An internal combustion engine having an odd numbered plurality of cylinders in a single plane perpendicular to the axis of the crankshaft, valve mechanism having at least two sliding members associated with each cylinder, a plurality of eccentric devices corresponding to the number of cylinders, and means interconnecting each of said eccentric devices to at least two of said sliding members, all of said means being located adjacent to a common plane parallel to but offset from the plane of the cylinders.

2. In an internal combustion engine, a plurality of cylinders, at least two sliding valve members for each of said cylinders, one of said valve members being of the "pull down" type and another of the said valve members being of the "push up" type, a plurality of independently driven valve operating eccentrics corresponding to the number of cylinders, and means interconnecting each of said eccentrics to operate at least one of said "push up" valve members and at least one of said "pull down" valve members in each of two adjacent cylinders.

3. In an internal combustion engine having more than two cylinders located in radial fashion in a plane perpendicular to the axis of the crank shaft, at least two sliding valve members for each of said cylinders, one of said members being open in its top position and controlling the intake to said cylinder, another of said members being open in its bottom position and controlling the exhaust from said cylinder, a plurality of valve operating eccentrics corresponding to the number of cylinders, means interconnecting each of said eccentrics to an intake valve member of one of said cylinders and an exhaust valve member of another of said cylinders, a plurality of said means lying in a common plane.

4. For an internal combustion engine having a crankshaft, two adjacent cylinders the axes of which lie in different planes through the crankshaft, a sliding valve of the push up type associated with one of said cylinders, a sliding valve of the pull down type associated with the other of said cylinders, a valve shaft located in the angle between said cylinders and driven by said crankshaft, a crank on said valveshaft, and means connected to said crank to operate both of said valves, the position of said valve shaft and said means being such as to provide for relatively retarded movement of the valve during the open period and accelerated movement of the valve for closing.

5. For an internal combustion engine, a crankshaft, an odd numbered plurality of cylinders radially disposed in a common plane about the axis of said crankshaft, a sliding type intake valve and a sliding type exhaust valve associated with each of said cylinders, a plurality of crank means corresponding to the number of cylinders, link means interconnecting each of said crank means to operate the intake valve of one cylinder and the exhaust valve of an adjacent cylinder, each of said crank means being mechanically connected with said crankshaft, the location of each of said crank means being between the plane formed by the axis of said crankshaft and the center line of one of said cylinders and the plane formed by the axis of said crankshaft and the center line of an adjacent cylinder, each of said crank means being further located in a plane offset from the plane of the cylinders.

6. In an internal combustion engine, a crankshaft, a plurality of cylinders radially disposed in a plane perpendicular to the axis of the crankshaft, a valve mechanism including a sliding type intake valve and a sliding type of exhaust valve for each cylinder, each of said valves having a port, a sliding rod member connected to each of said valves, a plurality of eccentrics mechanically interconnected with said crankshaft to operate at one-half crankshaft speed, two connecting rods attached to each of said eccentrics, one of said connecting rods being connected to the rod member of an intake valve of one cylinder, and the other of said connecting rods being attached to the rod member of the exhaust valve of an adjacent cylinder, the relationship of each eccentric and its connections with said valves being such that the exhaust valve port is open in the bottom position of the valve and the intake valve port is open in the top position of the valve.

7. An internal combustion engine having a plurality of cylinders disposed in radial fashion, a crankshaft, a slide type intake valve for each cylinder, a slide type exhaust valve for each cylinder, a plurality of eccentric devices corresponding to the number of cylinders, a pair of connecting links attached to each of said eccentric devices, each of said links being adapted to actuate one of said valves, a gear member coaxial with said crankshaft, a gear driven by said gear member connected to each of said eccentric devices, each of said gears being concentric with the axis of rotation of said eccentric devices, said gears being located in three different planes perpendicular to the axis of the crank shaft.

8. A mechanism having a crankshaft, a plurality of cylinders radially disposed in a plane perpendicular to the axis of the crankshaft, a piston in each of said cylinders interconnected with said crankshaft, at least two sliding valve members associated with each cylinder, a plurality of crank means interconnected with said crankshaft, the number of said crank means corresponding to the number of cylinders and each being mounted for rotation on an individual axis parallel to the axis of the crankshaft and located between the center of the cylinders, and rod means connecting a valve member from each of two cylinders to said crank means, said rod means being located in a plane offset from and parallel to the plane of the cylinders.

9. An internal combustion engine having a crankshaft, a plurality of cylinders radially disposed to the axis of said crankshaft, valve mechanism including a sliding type valve for each cylinder, a sliding guide member connected to each of said valves, a plurality of valve shafts, a connecting link attached to each of said sliding guide members and connected with one of said valve shafts, all of said guide members and connecting links being located in substantially a common plane, casing means and cover means arranged to support said guide members, said casing means and said cover means being arranged to part substantially at the plane of said guide members and providing the sole means of retaining said guide members, said links and said valve shafts in assembled relationship with said valves.

10. In a radial engine having valves of the sliding type, a crankshaft, a crankcase for supporting said crankshaft, a plurality of cylinders, each having an inner cylinder barrel and an outer cylinder barrel with an annular space between said barrels, valve mechanism including two valves for each cylinder having semi-circular sections and mounted for sliding movement between the inner and outer cylinder barrels and having a plurality of valve rods mounted in said crankcase for reciprocating motion, a plurality of eccentrics, a connecting link interconnecting each of said valve rods to one of said eccentrics, said crankcase having a wall part separating the portion of the crankcase housing the crank of said crankshaft from said valve mechanism, a completely enclosed chamber at the lower end of each outer cylinder, two of said valve rods passing from the portion of the crankcase housing said valve mechanism to each of said chambers.

11. For an internal combustion engine, a crankcase, an outer cylinder barrel fastened to said crankcase, an inner cylinder barrel, a sliding valve member between said barrels, said inner barrel having a portion projecting into said crankcase, said portion being of thinner wall section than the part of the inner cylinder barrel located inside said outer barrel and thereby forming a shoulder, a separate unflanged cylindrical ring supported by said crankcase and serving to locate both the outer cylinder barrel and the inner cylinder barrel in proper concentric position and also to maintain said inner barrel in longitudinal position by virtue of contact with said shoulder, whereby the inner cylinder barrel may be removed through the top of the outer barrel while said valve member remains in position.

12. In an internal combustion engine, a crankshaft, a plurality of cylinders radially disposed in a plane perpendicular to the axis of the crankshaft, valve mechanism including at least two sliding valve members for each cylinder, a plurality of valve shafts corresponding to the number of cylinders, each of said valve shafts being directly geared to said crankshaft, the axis of each of said valve shafts being parallel to the axis of said crankshaft, actuating means interconnecting two of said valve members to each of said valve shafts, said actuating means including an eccentric member having two non-concentric cranks attached to each of said valve shafts, and a connecting rod attached to each of said cranks for actuating one of said sliding valve members, all of said eccentric members being located in a plane parallel to and offset from the plane of the axes of said cylinders.

13. In an internal combustion engine having more than two cylinders arranged in radial fashion, a crank case to which said cylinders are attached, valve mechanism including two sliding members associated with each cylinder, a valve guide connected with each of said valve members to transmit reciprocating motion thereto, a stationary bushing for each guide having a flange portion located intermediate the ends of the bushing, a cover member for said crank case, said crank case and said cover member having recesses adapted to fit the flanges of said bushings.

14. For an engine having more than two cylinders arranged in radial fashion, valve mechanism including at least two sliding valves for each cylinder, a crank shaft, a plurality of valve shafts corresponding to the number of cylinders, a gear member concentric with said crank shaft, a gear concentric with each of said valve shafts, all of said gears being meshed with said shaft gear member and being driven thereby in a direction opposite to the rotation of said shaft gear member, and two connecting rods attached to each of said valve shafts whereby two valves are operated by each of said shafts.

15. For an internal combustion engine having a crankshaft and a plurality of cylinders having their pistons operating from one crank of said crankshaft, two semi-circular sliding valves for each cylinder, one of said valves controlling the inlet to its cylinder and the other controlling the exhaust from its cylinder, a valve shaft located in the angle between the cylinders and having an eccentric offset axially from the crank of said crankshaft, said eccentric of said valve shaft being arranged to actuate the valve controlling the exhaust in one of said cylinders and the valve controlling the intake in the other of said cylinders, one of said valves in each cylinder being of the "push-up" type and the other of said valves in each cylinder being of the "pull down" type.

16. In a mechanism having a crankshaft and a plurality of cylinders radially disposed in a plane perpendicular to the axis of the crankshaft, a piston in each of said cylinders interconnected with said crankshaft, and valve mechanism including a slide type valve for one of said cylinders which opens when the valve is in the position furthest away from said crankshaft, a sliding type valve in an adjacent cylinder which opens when the valve is in the position closest to said crankshaft, a valve shaft having an eccentric, rod means interconnecting the "push up" type valve from one cylinder and the "pull down" type valve from the other cylinder to said eccentric, the location of said valve shaft being between said cylinders, said rod means diverging from said eccentric whereby a motion is imparted to each of said valves which provides for faster movement of the valve during the periods of opening and closing than during the time it is open.

17. In an internal combustion engine of the radial type, a plurality of outer cylinders, an inner cylinder spaced annularly from each of said outer cylinders, a pair of semi-cylindrical valve members located in the annular space between each of said outer and inner cylinders, actuating mechanism for said valve members including a sliding valve rod connected to each of said valve members to transmit pure reciprocating motion thereto, a connecting rod attached to each valve rod, and an eccentric device for each cylinder, two of said connecting rods being attached to each of said eccentric devices, all of said valve rods and said connecting rods being adjacent to a common plane offset from the plane of the cylinders, the valve members of each pair being similar in external shape and having their straight edges adjacent a plane through the axis of the crankshaft and the axis of the cylinder to which each pair belong, the valve rods for each pair also being connected to said valve members adjacent to said last mentioned plane.

18. For an internal combustion engine having a plurality of cylinders radially disposed about a crankshaft, two semi-cylindrical sliding valve members for each cylinder, both of the valve members being similar in external shape and having their straight edges next to each other and adjacent a plane determined by the axis of the crankshaft and the axis of the cylinder to which they belong, a plurality of valve shafts corresponding to the number of cylinders, actuating means including an eccentric unit having two cranks attached to each of said valve shafts, all of said eccentric units being located close to a plane parallel to but offset from the plane of the cylinders, link means connecting the cranks of each of said eccentric units to the valves of one of said cylinders, the point of connection to the valves being adjacent the first mentioned plane.

WALTER KASTEN.